Patented May 10, 1949

2,469,356

UNITED STATES PATENT OFFICE 2,469,356

STABILIZED NATURAL SOIL COMPOSITION

Claude G. Hammond, Athens, Ga., assignor to
Alice S. Hammond, Athens, Ga.

No Drawing. Application June 27, 1947,
Serial No. 757,670

6 Claims. (Cl. 106—98)

This invention relates to a process of stabilizing natural soil for the production of building and surfacing materials and to the product resulting therefrom.

An object of this invention is the production of such materials which when fabricated into structural units will result in tough, durable, tenacious, homogeneous masses having great compressive and tensile strengths. These masses will be relatively impervious to moisture and weather and will also be free from attack by insects, worms and fungi.

A more specific object of this invention is the production of building and surfacing materials by a process which stabilizes natural soil by admixture with Portland cement and water into which has been dissolved copper sulphate or copper chloride. By natural soil, in this application, is meant loam, clay, and the like.

It is a well recognized fact that at the present time there exists a tremendous need of housing units. In spite of the great need, however, the present excessive cost of materials and labor makes the price of housing almost prohibitive to a great portion of those in need of them. It is, therefore, an additional object of this invention to produce building and surfacing materials having the above mentioned qualities at a cost far less than that of present commercial products. The low cost of the building materials made in accordance with this invention makes possible a type of construction which does not necessitate the use of costly, high skilled labor, thus further reducing the total cost of construction. For example, partition and load bearing walls, floors, and roofs may be made with this material without incurring the high cost for lumber and carpentry required for the usual type of present day construction.

Many attempts have been made to stabilize and weatherproof soil to produce suitable building and surfacing materials. The most commonly known produces the adobe products, the manufacture and use of which are restricted to certain arid or semi-arid areas. I am also aware that several prior attempts have been made to stabilize natural soil such as loam, clay, and the like by setting the same with Portland cement to which may or may not have been added such setting and insecticide agents as plaster of paris, calcium hydroxide, and sodium hydroxide or "caustic soda." However, the products of these prior methods I have found by extensive experiments to have one or more of the following drawbacks: (1) tendency to crack, creep or crumble, under extremes of temperature changes, (2) relatively non-moisture or weather proof, (3) insufficient compressive or tensile strengths, (4) subject to cracking or settling after being placed in construction, (5) sagging or fluffing during curing period, (6) subject to attack from worms, insects and mildew, (7) costliness of production or requirement of materials not readily available at present.

My invention consists in mixing Portland cement which is a hydraulic cement consisting essentially of a mixture of calcium aluminates, calcium silicates and calcium ferrites with natural soil in proportions varying from 5 to 18 pounds of Portland cement (unset) per cubic foot of soil depending upon (1) the type of soil (2) the method of fabrication i. e., pouring or compressive molding (3) compressive and tensile strengths desired. I have found cement in excess of 18 lbs. per cubic foot to have little value as to strength or weatherproofing.

Since it is well known and easily established that the density of unset Portland cement (powdered) is approximately 94 lbs. per cubic foot, the proportions of the dry mix may be expressed as from 5 to 18 parts by volume of cement to 94 parts of soil. It is equally well known and easily established that the density of set Portland cement is approximately 180 lbs. per cubic foot and therefore the proportions in the finished composition may be expressed as from 5 to 18 parts of cement by volume to 180 parts of soil.

The type of soil best suited for my process will have a sand content of approximately 50% by volume, although excellent results may be obtained using soil containing sand contents of from 25% to 70%. When required, sufficient sand may be added to the natural soil to bring the proportions to approximately 50% sand by volume.

I have found that the introduction of copper sulphate or copper chloride into the mixture of soil, cement and water results in a greatly superior product. The copper sulphate is introduced into the mixture by dissolving it in the water applied thereto. The amount of water will vary with the moisture contained in the soil to be stabilized. With comparatively dry soil, approximately 1 pound of copper sulphate or copper chloride dissolved in 40 gallons of potable water will give the desired results. This is approximately a ratio of 1 copper sulphate to 320 water by weight. Where the soil is moist the proportion of copper sulphate to water should be strengthened to maintain approximately the above ratio in the mixture. If fabrication is effected by a pouring method only sufficient water should be added to give a plastic mass. If fabrication is to be effected by compression a lesser amount of moisture is of course required. Thus, where the soil is comparatively dry approximately 10–11% moisture by weight per cubic foot of soil I have found to be the satisfactory minimum for affording a workable mass.

I have experimented with various other salts besides copper sulphate and while good results may also be obtained with copper chloride, none of the resulting products equal in strength the structural units containing copper sulphate. For example the following table lists the compressive strengths of several bricks fabricated by compression in the manner described above and containing different salts and includes the performance of a similarly fabricated brick but containing no corresponding chemical:

| Added Chemical | Age of Brick, days | Compressive Strength, lbs./in.$^2$ |
| --- | --- | --- |
| Copper sulphate | 26 | 1,020 |
| Sodium sulphate | 26 | 720 |
| Copper chloride | 26 | 960 |
| None | 26 | 600 |

It is not known exactly what the chemical functions of copper sulphate and copper chloride are in relation to the other ingredients of the mixture employed in my method which will fully explain the above described advantages resulting from the use thereof. However, the following effects have been noted in the case of each:

(1) Materially aids in the binding and weatherproofing.
(2) Retards flocculation of soil during the mixing process, thus insuring a more intimate mixture.
(3) Prevents insects, worms and fungi from attacking the finished product.
(4) Affords a denser product thereby increasing the compressive and tensile strengths by approximately 40 per cent.
(5) Affords a more stable soil-cement composition when the setting process has been completed.

I claim:

1. A settable building composition consisting of a mixture of natural soil which contains clay in varying proportions and a sand content of from 25% to 70% by volume, a hydraulic cement consisting principally of a mixture of calcium silicates, calcium aluminates and calcium ferrites, and water in the proportions by volume of from 5 to 18 parts of said cement to approximately 94 parts of said natural soil with water added in sufficient quantity to produce a plastic, settable mass, and a copper salt of the group consisting of copper sulphate and copper chloride in the approximate percentage of $100/_{320}$ based on the weight of water in the mixture.

2. A settable building composition consisting of a mixture of natural soil which contains clay in varying proportions and a sand content of from 25% to 70% by volume, a hydraulic cement consisting principally of a mixture of calcium silicates, calcium aluminates and calcium ferrites, and water in the proportions by volume of from 5 to 18 parts of said cement to approximately 94 parts of said natural soil with water added in sufficient quantity to produce a plastic, settable mass, and copper sulphate in the approximate percentage of $100/_{320}$ based on the weight of water in the mixture.

3. A settable building composition consisting of a mixture of natural soil which contains clay in varying proportions and a sand content of from 25% to 70% by volume, a hydraulic cement consisting principally of a mixture of calcium silicates, calcium aluminates and calcium ferrites, and water in the proportions by volume of from 5 to 18 parts of said cement to approximately 94 parts of said natural soil with water added in sufficient quantity to produce a plastic, settable mass, and copper chloride in the approximate percentage of $100/_{320}$ based on the weight of water in the mixture.

4. A building composition consisting of stabilized natural soil which contains clay in varying proportions and a sand content of from 25% to 70% by volume, with hydrolyzed Portland cement as a binder in the proportion by volume of from 5 to 18 parts of said cement to 180 parts of said natural soil to which has been added a copper salt of the group consisting of copper sulphate and copper chloride in the approximate percentage of $100/_{320}$ based on the weight of water therein prior to hydrolyzation of the cement.

5. A building composition consisting of stabilized natural soil which contains clay in varying proportions and a sand content of from 25% to 70% by volume with hydrolyzed Portland cement as a binder in the proportion by volume of from 5 to 18 parts of said cement to 180 parts of said natural soil, to which has been added copper sulphate in the approximate percentage of $100/_{320}$ based on the weight of water therein prior to hydrolyzation of the cement.

6. A building composition consisting of stabilized natural soil which contains clay in varying proportions and a sand content of from 25% to 70% by volume with hydrolyzed Portland cement as a binder in the proportion by volume of from 5 to 18 parts of said cement to 180 parts of said natural soil to which has been added copper chloride in the approximate percentage of $100/_{320}$ based on the weight of water therein prior to hydrolyzation of the cement.

CLAUDE G. HAMMOND.

REFERENCES CITED

The following references are of record in the file of this patent:

UNITED STATES PATENTS

| Number | Name | Date |
| --- | --- | --- |
| 945,694 | Phillips | Apr. 12, 1910 |
| 1,269,695 | Fairfax | June 18, 1918 |
| 1,296,468 | Blumenberg | Mar. 4, 1919 |
| 2,370,983 | Miller | Mar. 6, 1945 |

FOREIGN PATENTS

| Number | Country | Date |
| --- | --- | --- |
| 387,429 | Great Britain | 1933 |